United States Patent
Urban et al.

(12) 
(10) Patent No.: US 11,563,975 B2
(45) Date of Patent: Jan. 24, 2023

(54) MOTION COMPENSATION BOUNDARY FILTERING

(71) Applicant: InterDigital VC Holdings, Inc., Wilmington, DE (US)

(72) Inventors: Fabrice Urban, Cesson-Sevigne (FR); Antoine Robert, Cesson-Sevigne (FR); Franck Galpin, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/284,678

(22) PCT Filed: Dec. 16, 2019

(86) PCT No.: PCT/US2019/066488
§ 371 (c)(1),
(2) Date: Apr. 12, 2021

(87) PCT Pub. No.: WO2020/139596
PCT Pub. Date: Jul. 2, 2020

(65) Prior Publication Data
US 2021/0360285 A1 Nov. 18, 2021

(30) Foreign Application Priority Data

Dec. 26, 2018 (EP) .................................. 18306844
Jun. 12, 2019 (EP) .................................. 19305749

(51) Int. Cl.
*H04N 19/583* (2014.01)
*H04N 19/105* (2014.01)
(Continued)

(52) U.S. Cl.
CPC ........ *H04N 19/583* (2014.11); *H04N 19/105* (2014.11); *H04N 19/117* (2014.11);
(Continued)

(58) Field of Classification Search
CPC .. H04N 19/583; H04N 19/105; H04N 19/117; H04N 19/132; H04N 19/137;
(Continued)

(56) References Cited

U.S. PATENT DOCUMENTS

| | | | |
|---|---|---|---|
| 2009/0060044 A1* | 3/2009 | Suh | H04H 60/13 375/240.16 |
| 2013/0113884 A1* | 5/2013 | Leontaris | H04N 19/48 348/43 |

(Continued)

OTHER PUBLICATIONS

Chen et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11, 7th Meeting: Torino, IT, pp. 1-48, Jul. 13-21, 2017.
(Continued)

*Primary Examiner* — Richard T Torrente
(74) *Attorney, Agent, or Firm* — Xiaoan Lu

(57) ABSTRACT

At least a method and an apparatus are presented for efficiently encoding or decoding video. For example, a prediction block for a current block is obtained. A reconstructed neighboring block of the prediction block is obtained. Filtering is performed on a boundary between the prediction block and the reconstructed neighboring block. At the encoder side, the prediction residual is obtained as the difference between the filtered prediction block and the current block, and then encoded. At the decoder side, the prediction residual is added to the filtered prediction block to reconstruct the current block.

20 Claims, 10 Drawing Sheets

(51) Int. Cl.
*H04N 19/117* (2014.01)
*H04N 19/132* (2014.01)
*H04N 19/137* (2014.01)
*H04N 19/176* (2014.01)
*H04N 19/96* (2014.01)
*H04N 19/61* (2014.01)
*G06T 9/40* (2006.01)
*H04N 19/119* (2014.01)
*H04N 19/82* (2014.01)

(52) U.S. Cl.
CPC ......... *H04N 19/132* (2014.11); *H04N 19/137* (2014.11); *H04N 19/176* (2014.11); *H04N 19/96* (2014.11); *G06T 9/40* (2013.01); *H04N 19/119* (2014.11); *H04N 19/61* (2014.11); *H04N 19/82* (2014.11)

(58) Field of Classification Search
CPC .... H04N 19/176; H04N 19/96; H04N 19/119; H04N 19/61; H04N 19/82; H04N 19/86; G06T 9/40
See application file for complete search history.

(56) References Cited

U.S. PATENT DOCUMENTS

2013/0287097 A1  10/2013  Song et al.
2019/0089961 A1*  3/2019  Ahn ..................... H04N 19/13
2021/0243465 A1*  8/2021  Chen .................... H04N 19/132
2021/0360237 A1*  11/2021  Andersson ........... H04N 19/176

OTHER PUBLICATIONS

Chen et al., "Algorithm description for Versatile Video Coding and Test Model 3 (VTM 3)", Document: JVET-L1002-v1, Joint Video Experts Team (JVET) of ITU-T SG 16 WP 3 and ISO/IEC JTC 1/SC 29/WG 11, 12th Meeting: Macao, CN, pp. 1-37, Oct. 2018.
Anonymous, "High Efficiency Video Coding", Series H: Audiovisual and Multimedia Systems, Infrastructure of audiovisual services—Coding of moving video, Telecommunication Standardization Sector of ITU, Recommendation ITU-T H.265, pp. 540 pages, Oct. 2014.
Zhang et al., "Improvement of cross-component prediction", Document:JCTVC-R0219_r3, Joint Collaborative Team on Video Coding (JCT-VC) of ITU-T SG 16 WP 3 and ISO/IEC JTC 1/SC 29/WG 11, 18th Meeting: Sapporo, JP, pp. 1-6, Jun. 30-Jul. 9, 2014.

* cited by examiner

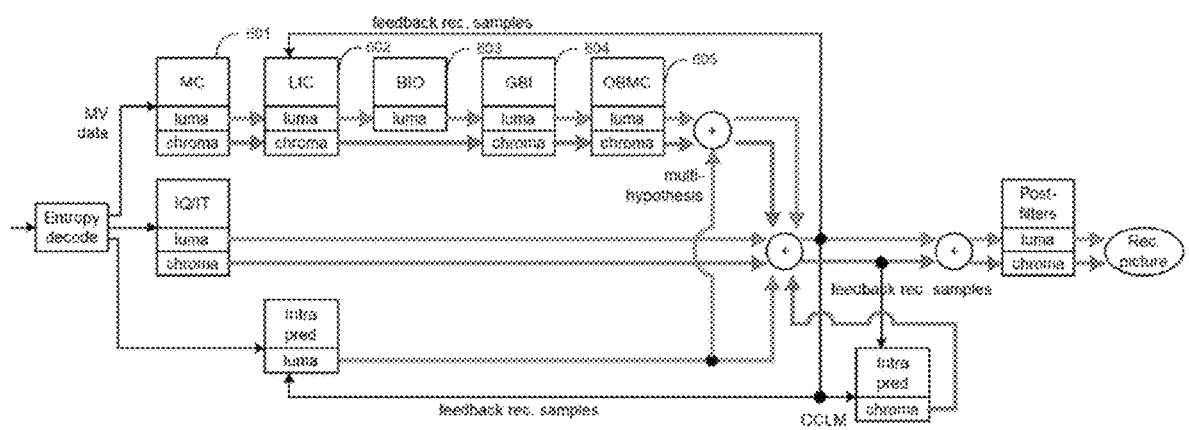
FIG. 6
 
FIG. 7A          FIG. 7B

MOTION COMPENSATION BOUNDARY FILTERING

This application claims the benefit, under 35 U.S.C. § 371 of International Application No. PCT/US2019/066488, filed Dec. 16, 2019, which was published on Jul. 2, 2020, which claims the benefit of European Patent Application Nos. EP18306844.4 filed Dec. 26, 2018 and EP19305749.4 filed Jun. 12, 2019.

TECHNICAL FIELD

The present embodiments generally relate to a method and an apparatus for video encoding or decoding, and more particularly, to a method and an apparatus for efficiently encoding and decoding of video in which filtering is performed on a boundary between a prediction block and a reconstructed neighboring block of a current block.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method for video encoding is presented, comprising: obtaining a prediction block for a current block; obtaining a reconstructed neighboring block of the prediction block; performing filtering on a boundary between the prediction block and the reconstructed neighboring block; and encoding the current block based on the filtered boundary.

According to another embodiment, a method for video decoding is presented, comprising: obtaining a prediction block for a current block; obtaining a reconstructed neighboring block of the prediction block; performing filtering on a boundary between the prediction block and the reconstructed neighboring block; and decoding the current block based on the filtered boundary.

According to another embodiment, an apparatus for video encoding is presented, comprising: means for obtaining a prediction block for a current block; means for obtaining a reconstructed neighboring block of the prediction block; means for performing filtering on a boundary between the prediction block and the reconstructed neighboring block; and means for encoding the current block based on the filtered boundary.

According to another embodiment, an apparatus for video decoding is presented, comprising: means for obtaining a prediction block for a current block; means for obtaining a reconstructed neighboring block of the prediction block; means for performing filtering on a boundary between the prediction block and the reconstructed neighboring block; and means for decoding the current block based on the filtered boundary.

According to another embodiment, an apparatus for video encoding is presented, comprising one or more processors, wherein said one or more processors are configured to: obtain a prediction block for a current block; obtain a reconstructed neighboring block of the prediction block; perform filtering on a boundary between the prediction block and the reconstructed neighboring block; and encode the current block based on the filtered boundary.

According to another embodiment, an apparatus for video decoding is presented, comprising one or more processors, wherein said one or more processors are configured to: obtain a prediction block for a current block; obtain a reconstructed neighboring block of the prediction block; perform filtering on a boundary between the prediction block and the reconstructed neighboring block; and decode the current block based on the filtered boundary.

According to another embodiment, a signal comprising encoded video is formed by performing: obtaining a prediction block for a current block; obtaining a reconstructed neighboring block of the prediction block; performing filtering on a boundary between the prediction block and the reconstructed neighboring block; and encoding the current block based on the filtered boundary.

BRIEF DESCRIPTION OF THE DRAWINGS

FIG. 6 is a pictorial example illustrating a process to build an inter-predicted block.

FIG. 7A and FIG. 7B are respectively pictorial examples illustrating a picture before and after deblocking filtering is applied.

DETAILED DESCRIPTION

Figure 1:
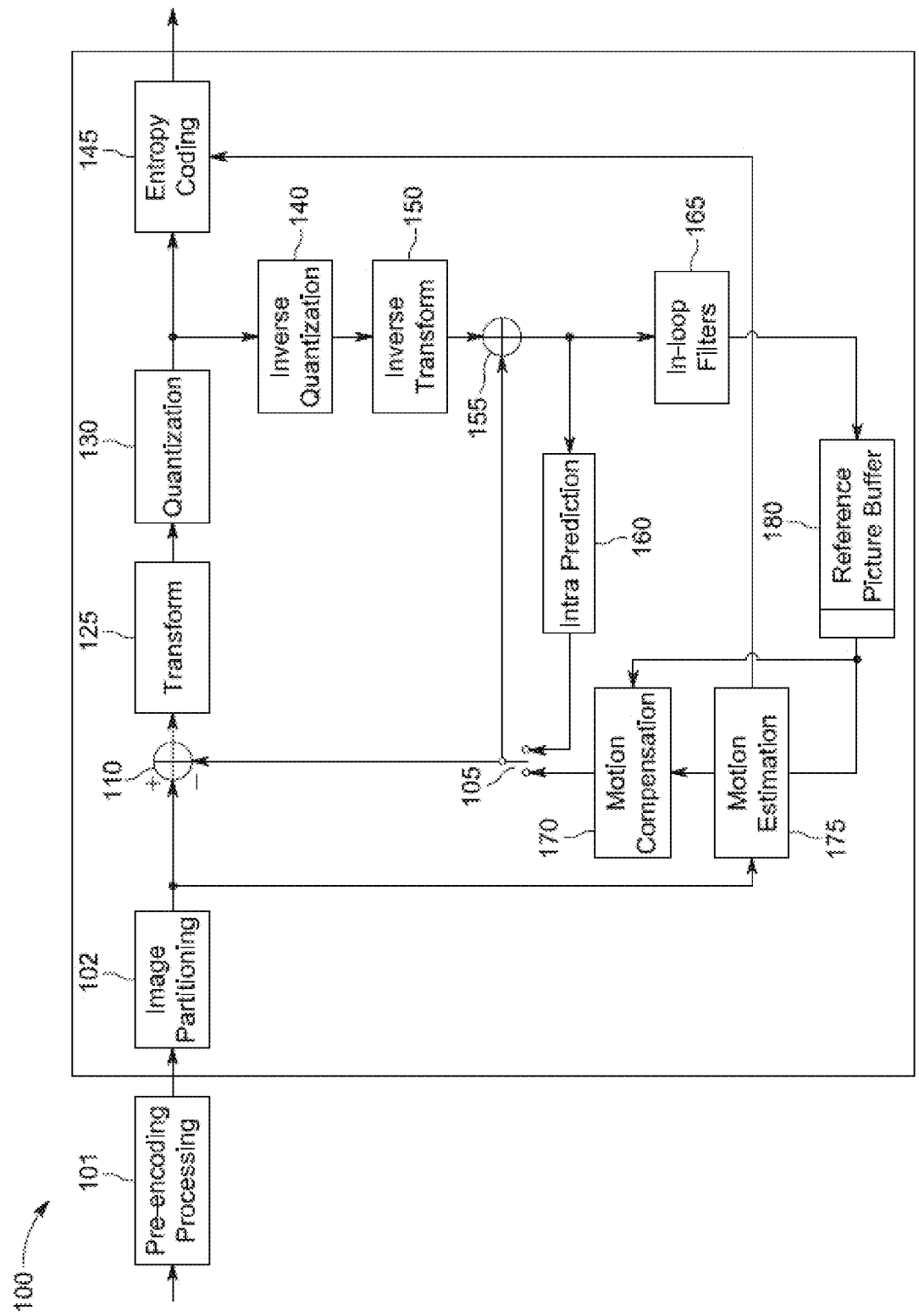
FIG. 1 illustrates a block diagram of an embodiment of a video encoder.

FIG. 1 illustrates an example video encoder 100, such as a High Efficiency Video Coding (HEVC) encoder. FIG. 1 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image", "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In HEVC, to encode a video sequence with one or more pictures, a picture is partitioned (102) into one or more slices where each slice may include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (e.g., Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" may be used to refer, for example, to any of CTU, CU, PU, TU, CB, PB, and TB. In addition, the "block" may also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
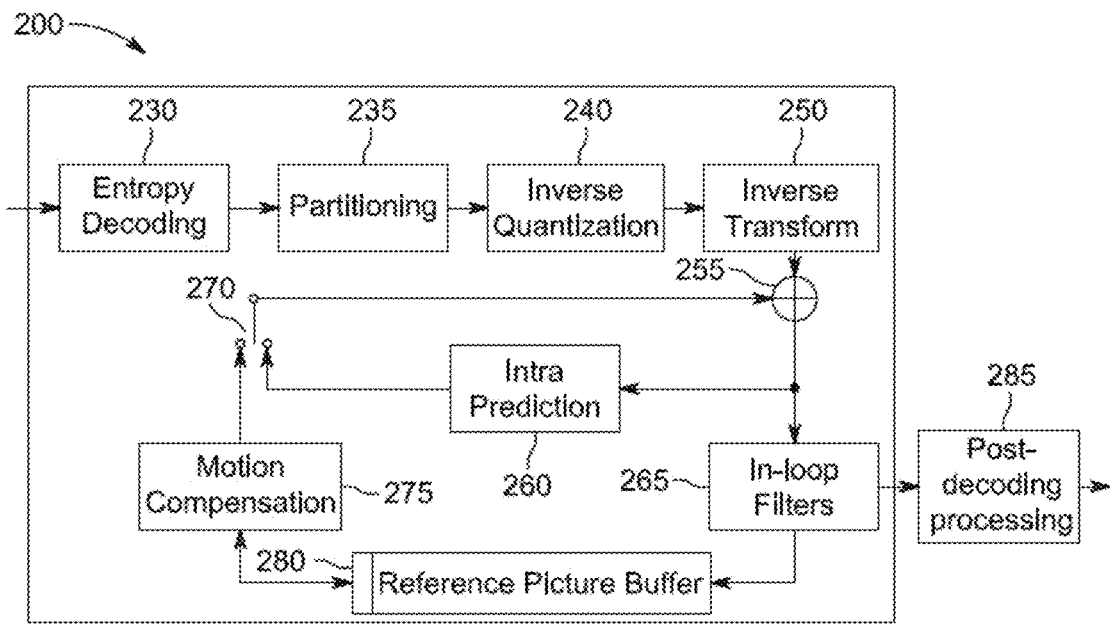
FIG. 2 illustrates a block diagram of an embodiment of a video decoder.

FIG. 2 illustrates a block diagram of an example video decoder 200, such as an HEVC decoder. In decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a VVC decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In case of bi-prediction, two motion compensated predictions may be combined with a weighted sum. In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

The present disclosure is in the field of video compression and decompression. It aims at improving coding efficiency in inter slices compared to existing video compression systems, such as HEVC and VTM-1 (see "Algorithm description for Versatile Video Coding and Test Model 1 (VTM 1)", J. Chen, E. Alshina, document JVET-J1002, Joint Video Experts Team (JVET) 10th Meeting: San Diego, US, Apr. 10-20, 2018). The present disclosure proposes to simplify post processing of prediction block filtering in inter slices.

Figure 3:
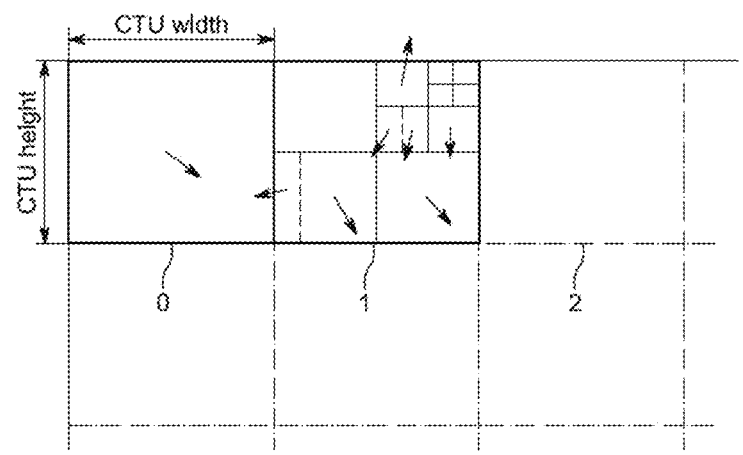
FIG. 3 is a pictorial example illustrating Coding Tree Unit and Coding Tree concepts to represent a compressed HEVC picture.
Figure 4:
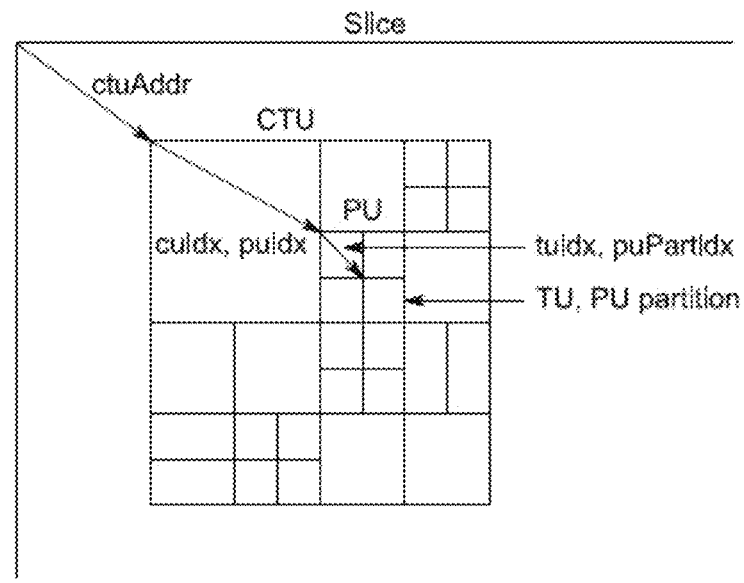
FIG. 4 is a pictorial example illustrating a division of a Coding Tree Unit into Coding Units, Prediction Units and Transform Units.

In the HEVC video compression standard, a picture is divided into so-called Coding Tree Units (CTU), whose size is typically 64×64, 128×128, or 256×256 pixels. Each CTU is represented by a Coding Tree in the compressed domain. This is a quad-tree division of the CTU, where each leaf is called a Coding Unit (CU), as illustrated in FIG. 3. Each CU is then given some intra or inter prediction parameters (e.g., Prediction Info). To do so, it is spatially partitioned into one or more Prediction Units (PUs), each PU being assigned some prediction information. The intra or inter coding mode is assigned on the CU level, as illustrated in FIG. 4.

Exactly one Motion Vector (MV) is assigned to an inter-coded PU in HEVC (or a pair of MVs for the bi-directional case). This motion vector is used for motion compensated temporal prediction of the considered PU. In HEVC, the motion model that links a predicted block and its reference block simply consists in a translation.

In the JEM (see J. Chen, E. Alshina, G. J. Sullivan, J.-R. Ohm, J. Boyce, "Algorithm Description of Joint Exploration Test Model 7 (JEM 7)". JVET 7th Meeting: Torino, IT, Jul. 13-21, 2017, JVET-G1001), as opposed to purely translational model, a PU can contain a motion field at the sub-block level (e.g. several 4×4 square sub-blocks, each having its own motion vector) using a common parametric motion model (e.g. affine mode) or using stored temporal motion (e.g. ATMVP).

OBMC (Overlapped Block Motion Compensation)

In the JEM, the motion compensation step is followed, for all Inter CUs regardless of their coding mode (sub-block based or not), by a process called OBMC (Overlapped Block Motion Compensation) that aims at attenuating the motion transitions between CUs and inside those which are divided into sub-blocks (somehow like the deblocking filter with the blocking artifacts). Depending on the CU coding mode (for example affine mode, ATMVP, translational mode), the OBMC method applied is not the same. Two distinct processes exist, one for CUs that are divided into smaller parts (e.g., affine and FRUC), and one for the other CUs (entire ones).

In the state-of-the-art, the first step of the OBMC process consists in detecting the kind of CU to perform OBMC on, either on the block boundaries or also on the sub-blocks inside the CU block.

Figure 5:
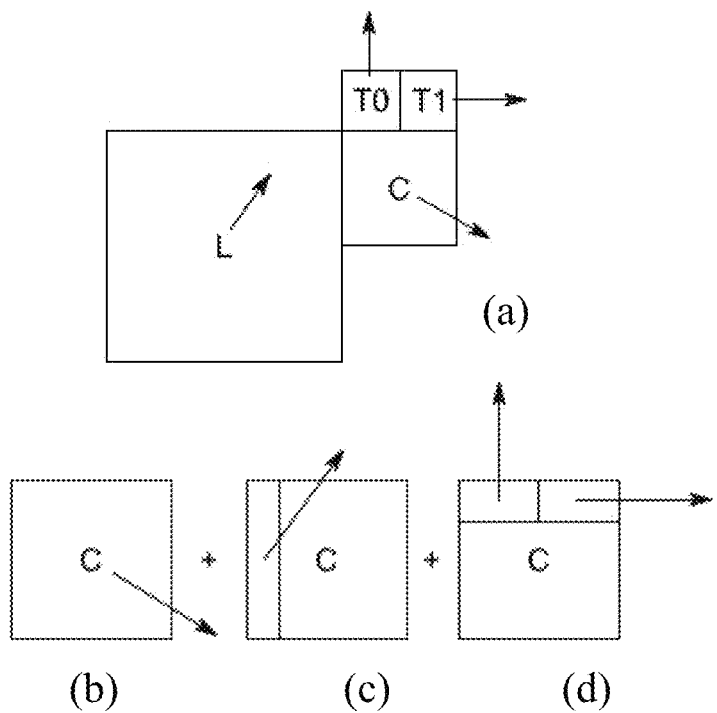
FIG. 5 is a pictorial example illustrating an overview of OBMC (Overlapped Block Motion Compensation) principles.

In FIG. 5, we show the basic principle of OBMC for a block-based OBMC, using top and left blocks:

The current block C is first motion compensated with the motion vector of the current block.

The left band (shaded area in FIG. 5(*c*)) of the current block C is motion compensated with the motion vector of the left block neighbor L.

The top band (shaded area in FIG. 5(*d*)) of the current block C is motion compensated using the motion vectors of the top block neighbors T0 and T1.

A weighted sum (either at block level or pixels levels) is then performed in order to compute the final motion compensated block.

In FIG. 6, we show an example of a pipeline to construct a block. Some of the stages can be bypassed or other processes may be added. Regarding the decoding of an inter-predicted block, the following processes might be used:

MC (601): motion compensation (either by block or sub-block). Here, when uni-directional prediction is used, the motion-compensated prediction block at location (m, n) may be expressed as Pred(m, n)=ref(m+$mv_x$, n+$mv_y$), where $mv_x$ and $mv_y$ represent the motion vector (i.e., displacement), ref is the reference picture. When the motion vector is at a fractional resolution, the reference may be interpolated.

LIC (602): Local Illumination compensation. Change the predicted samples values using a linear adaptation.

BIO (603): bi-prediction optical flow. Change the predicted samples values using the result of an optical flow estimation between the two reference blocks used to reconstruct the block. Another variant is DMVR (decoder-side motion vector refinement, not shown in FIG. 6).

GBI (604): Generalized bi-prediction. GBI uses a weighted average of two reference blocks to reconstruct the block.

OBMC (605): overlapped block motion compensation. A weighted average of motion compensated blocks using different motion vectors from neighboring blocks is used to predict the block.

IQ/IT: inverse quantization and inverse transform. IQ/IT is used to reconstruct the residual.

Intra prediction: used to predict a block using surrounding sample values.

Multi-hypothesis: merge together several predictions (typically inter and intra) using a weighted average depending on the position. Also extend to triangular multi-hypothesis where several inter prediction can be merged inside a block.

CCLM: Cross Components Linear Model. Use another already reconstructed component to predict the current component using a linear model.

Currently, the OBMC process for a particular block is performed during the reconstruction of this block. It means that the parameters needed to perform the motion compensation of each neighboring band needs to be saved in each neighboring block.

It is to be noted here, in the example as shown in FIG. 6, other prediction processes (602, 603, 604) are used to adjust the motion-compensated prediction results from the initial motion compensation process (601), and thus, the MC results may evolve depending on the stage of prediction. For example, the MC result, after LIC is applied, is different from the one from the initial MC result (601).

Deblocking Filter (DBF)

The deblocking filter is applied after the pictures have been reconstructed. It aims at reducing blocking artefacts by smoothing the sample values near the block edges as illustrated in FIG. 7A (before deblocking filter) and FIG. 7B (after deblocking filter).

Figure 8:
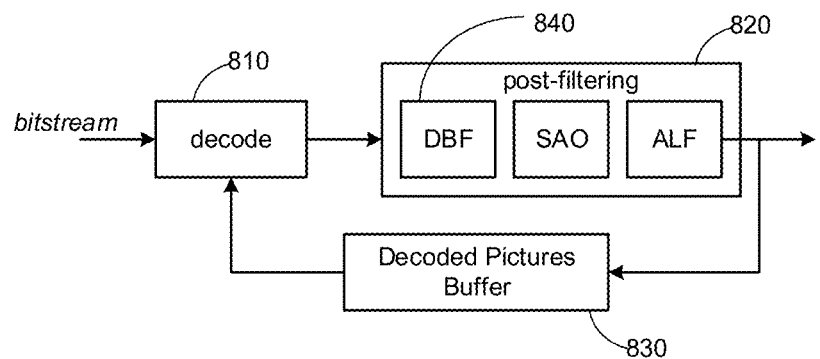
FIG. 8 is a pictorial example illustrating a post-filtering stage in a decoder architecture.

Typically, as depicted in FIG. 8, the deblocking filter (840) is one of the coding artefacts reduction post-filter (820) and is applied after the block samples have been reconstructed (810). The post-filtered pictures can be displayed and are possibly stored in the decoded picture buffer (830) to be used for building the motion compensated prediction.

Boundary Strength (BS)

Figure 9:
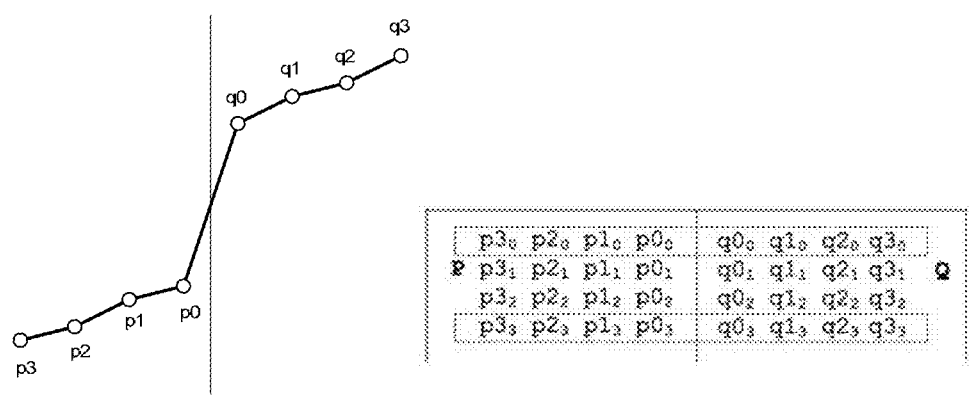
FIG. 9 is a pictorial example illustrating a block boundary with blocking artefacts.

An example of block boundary samples with a blocking artefact is depicted in FIG. 9, where the samples P={p0, p1, p2, p3} and Q={q0, q1, q2, q3} belong to two adjacent blocks P and Q. In general, the artefact visibility is proportional to the relative difference between samples values of P and Q. That is why, the DBF filtering performs sample smoothing S across the block edges. The smoothing/filtering function S parameters are:

Boundary strength (BS)={0—weak, 1—normal or 2—strong}

Sample values of the blocks P, Q

Let {MViX, ref-iX} denote the MV value and reference index for the reference picture list "i" for the block X (X=P or Q). By convention, if the block X is uni-directionally predicted with list-0 (resp. list-1), then {MV1X is set to zero and ref-1X is set to "−1" } (resp. {MV0X is set to zero and ref-0X is set to "−1" }).

Figures 10, 11:
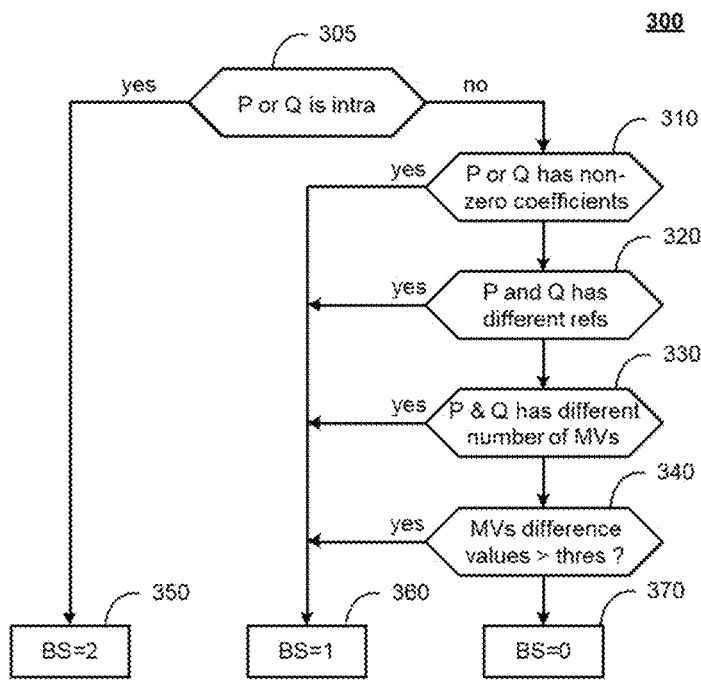
FIG. 10 illustrates a process for determining a Boundary Strength (BS) parameter.
FIG. 11 illustrates a process for determining deblocking filter strength.

As illustrated in FIG. 10, a determination process (300) of boundary strength (BS) may depend (350, 360, 370) on several block parameters and turns out in successive checks such as, for example, as in JEM:

(305): P or Q is intra or inter (310): P and Q has zero coefficients (320): P and Q have different reference indexes. If P is bi-predicted ({$MV0_P$, ref-$0_P$}, {$MV1_P$, ref-$1_P$}) and Q is uni-directional predicted {$MV0_Q$, ref-$0_Q$}, then check if:

$$\text{ref-}0_P \neq \text{ref-}0_Q \text{ and ref-}1_P \neq \text{ref-}0_Q \quad \text{(check.1)}$$

(330): P and Q have different number of references (uni-directional or bi-prediction). In a variant, (330) is not present and in uni-dir, the MV value of the missing reference is inferred to be zero.

(340): P and Q motion vectors with same reference have difference greater than a threshold value. In a variant, if P is bi-predicted ({$MV0_P$, ref-$0_P$}, {$MV1_P$, ref-$1_P$}) and Q is uni-directional predicted {$MV0_Q$, ref-$0_Q$}, then check if:

$$\text{if ref-}0_P = \text{ref-}0_Q \text{ and } |MV0_P - MV0_Q| > \text{threshold}$$

$$\text{or if ref-}1_P = \text{ref-}0_Q \text{ and } |MV1_P - MV0_Q| > \text{threshold} \quad \text{(check.2)}$$

In case of Luma, only block boundaries with BS equal to 1 or 2 are filtered. In case of Chroma, only block boundaries with BS equal to 2 are filtered:

BS=0: No boundary filter

BS=1 or 2: weak or strong boundary filter depending on gradient

Filter Strength

FIG. 11 illustrates a process (400) for determining deblocking filter strength. Independently of the way BS is determined (FIG. 10), an additional test (415 depicted in FIG. 11) determines whether filtering applies or not if BS>0 (405), based on a set of conditions involving combination of absolute differences of weighted sample values compared to a pre-determined threshold $\beta$:

$$|p2_0 - 2p1_0 + p0_0| + |p2_3 - 2p1_3 + p0_3| + |q2_0 - 2q1_0 + q0_0| + |q2_3 - 2q1_3 + q0_3| > \beta \quad \text{(eq.1)}$$

If the filter applies, the filtering process (430) as shown in FIG. 11 modifies one or more of the P, Q samples on each side of the boundary (FIG. 9) depending on the sample values (410). The strength of the filtering process (normal or strong) is determined (420) for each boundary (line or column) on both sides of the boundary, based on a set of conditions involving the combination of absolute differences of weighted sample values compared to pre-determined thresholds. Some thresholds are function of the quantization parameter (QP) (440).

Then, each line (resp. column) along the vertical (resp. horizontal) boundary of the block are processed. The number of samples modified by filtering (430) on each side of the block boundary depends on the filter strength. A stronger filter strength affects more pixels on each side of the block boundary.

The strong filter modifies 3 pixels on each side of the boundary, based on the value of 4 pixels on each side. The weak filter modifies 2 pixels on each side of the boundary, based on 3 pixels on each side.

Motion Compensation Boundary Filtering

As described above, the OBMC process requires random access to reference images from up to 5 reference blocks for a single sub-block, and hence 5 different memory locations. The bandwidth requirement on decoder side is thus very high.

In order to reduce blocking artifacts due to the difference of prediction between neighboring blocks, the present methods aim at smoothing block boundaries at the prediction phase, before adding the residual. The principle disclosed in this application also applies to PUs that are divided into sub-blocks (with different motion for each sub-block—e.g. affine, ATMVP) or not (constant motion in the whole PU).

In one embodiment, the OBMC process, which includes multiple MC processes, is replaced by a filtering process. The filtering applies where necessary (e.g., as described by the regular OBMC process), for inter and/or intra CUs. Filtering can be for example based on a deblocking filter.

One or more of the following features may be used in the proposed techniques:

Adaptation is applied before reconstruction of the current CU (i.e., neighboring CUs are reconstructed, but for current CU (or PU), only prediction is performed at this stage).

Only the current CU or PU side of the boundary can be modified, and not reconstructed neighboring CUs.

Access to neighboring CUs can be limited to one column/row of reconstructed CU pixels.

Access to neighboring reconstructed CU pixels can be limited or forbidden at CTU boundaries.

The process can be simplified for sub-PUs motion (affine or ATMVP for example) to reduce complexity.

A simpler filter, as one inspired from Position Dependent intra Prediction Combination (PDPC) intra prediction can be used to reduce even more complexity of PU boundary filtering.

In one embodiment, the OBMC process is replaced by filtering as described in the following. By using filtering at the motion prediction stage at the block level, we aim to obtain the effect of OBMC at smoothing the prediction. At the encoder side, the prediction residual is obtained as the difference between the filtered prediction block and the current block. At the decoder side, the prediction residual is added to the filtered prediction block to reconstruct the current block.

Referring back to FIG. 6, the OBMC may be replaced by the proposed filtering techniques. Using FIG. 5 as an example, only one MC (e.g., (b) in FIG. 5) remains, and MC for neighboring PUs (e.g., (c)-(d) in FIG. 5) are no longer used. Frontiers between PUs are then smoothed using filtering of the predicted pixels, based on the reconstructed neighbors.

In the above, we describe that the filtering is used to replace OBMC. It should be noted that the present embodiment can apply even if OBMC is kept or different combinations of prediction methods are used. The general concept is to filter the boundary of the prediction block and neighboring reconstructed block to smooth the boundary, regardless the motion prediction methods used to obtain the prediction block.

Figure 12:
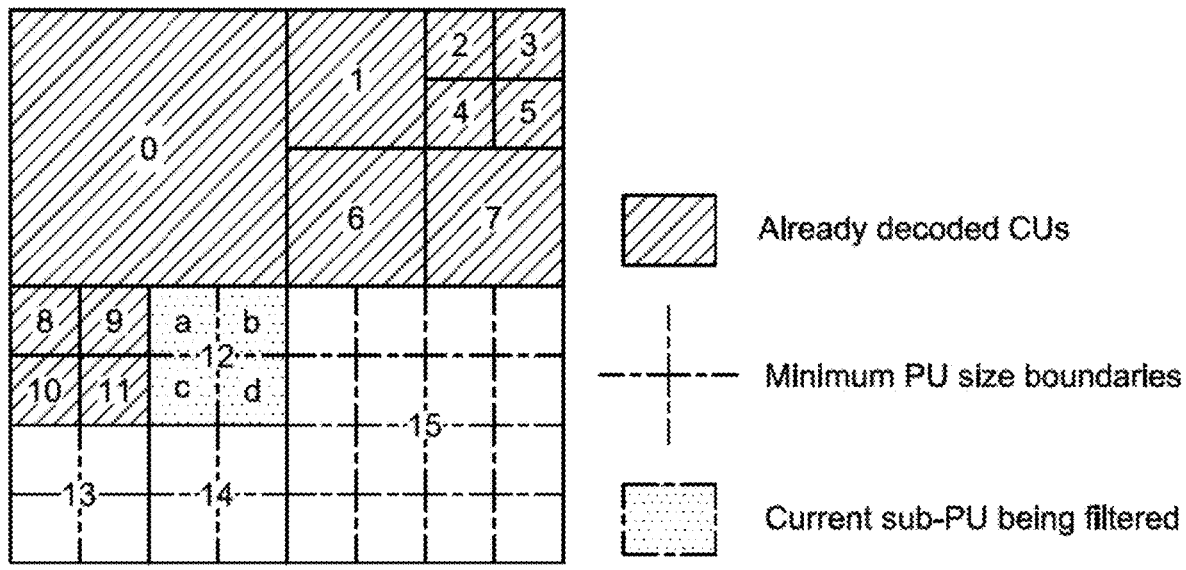
FIG. 12 is a pictorial example illustrating boundary filtering for a current CU and sub-PUs a-d being encoded/decoded.

An example of processing CUs is depicted in FIG. 12. CU 12 is the block being coded. CUs 0 to 11 have already been coded and are available as decoded references. Only pixels of predicted CU 12 will be modified with filtering along PU edges. Pixels of reconstructed neighboring CUs will be used as references.

Deblocking Based Filtering

Boundary filtering of the predicted pixels on the border of the predicted PUs can be inspired from the deblocking filter used in the HEVC standard. The deblocking filtering process may be modified to consider that the block is only predicted (not yet fully reconstructed), as explained in the following.

Boundary Strength (BS)

First the boundary strength between the current block Q and a neighboring block P is evaluated. The determination of BS (1350, 1360, 1370) may depend on several block parameters and turns out in successive checks such as for example as for the deblocking filter in JEM (FIG. 13):

(1305): P or Q is intra or inter
(1310): P has non-zero coefficients
(1320): P and Q have different reference indexes. If P is bi-predicted ($\{MV0_P, ref\text{-}0_P\}, \{MV1_P, ref\text{-}1_P\}$) and Q is uni-directional predicted $\{MV0_Q, ref\text{-}0_Q\}$, then check if:

ref-$0_P \neq$ ref-$0_Q$ and ref-$1_P \neq$ ref-$0_Q$ (1330): P and Q have different number of references (uni-directional or bi-prediction). In a variant, (1330) is not present and in uni-dir, the MV value of the missing reference is inferred to be zero.
(1340): P and Q motion vectors with same reference have difference greater than a threshold value. In a variant, if P is bi-predicted ($\{MV0_P, ref\text{-}0_P\}, \{MV1_P, ref\text{-}1_P\}$) and Q is uni-directional predicted $\{MV0_Q, ref\text{-}0_Q\}$, then check if:

if ref-$0_P$=ref-$0_Q$ and |MV0$_P$−MV0$_Q$|>threshold or if ref-$1_P$=ref-$0_Q$ and |MV1$_P$−MV0$_Q$|>threshold.

In case of Luma, only block boundaries with BS equal to 1 or 2 are filtered. In case of Chroma, only block boundaries with BS equal to 2 are filtered:

BS=0: No boundary filter
BS=1 or 2: weak or strong boundary filter depending on gradient.

Filter Strength

Independently of the way BS is determined, an additional test (415 depicted in FIG. 11 —same as deblocking filter) determines whether filtering applies or not, based on a set of conditions involving combination of absolute differences of weighted sample values compared to a pre-determined threshold β:

$|p2_0-2p1_0+p0_0|+|p2_3-2p1_3+p0_3|+|q2_0-2q1_0+q0_0|+|q2_3-2q1_3+q0_3|>\beta$ (eq.1)

If the filter applies, the filtering process (430) as shown in FIG. 11 modifies one or more of the Q samples on the current PU side of the boundary depending on the sample values (410). The strength of the filtering process (normal or strong) is determined (420) for each boundary (line or column), based on a set of conditions involving combination of absolute differences of weighted sample values compared to pre-determined thresholds. Some thresholds are function of the quantization parameter (QP) of block P (440).

Then, each line (resp. column) along the vertical (resp. horizontal) boundary of the block are processed. The number of samples modified by (430) on the current PU side of the block boundary depends on the filter strength. The stronger filter strength affects more pixels on each side of the block boundary.

Filtering Pixels

Referring back to FIG. 12, CU 12 will be filtered sub-PU by sub-PU: top border between a and 0, top border between b and 0, left border between a and 9, and left border between c and 11. In addition, if CU 12 is coded with Sub-PU motion (e.g., affine, ATMVP), inside borders will also be filtered, with predicted values as reference: horizontal borders between a and c, and b and d, and vertical borders between a and b, and c and d.

In one embodiment, the order of processing is first all horizontal borders to be filtered inside the CU, then vertical borders. In a variant of the processing order, the order of processing is done sub-PU by sub-PU in a raster-scan order, first horizontal borders, then vertical borders.

Figure 13:
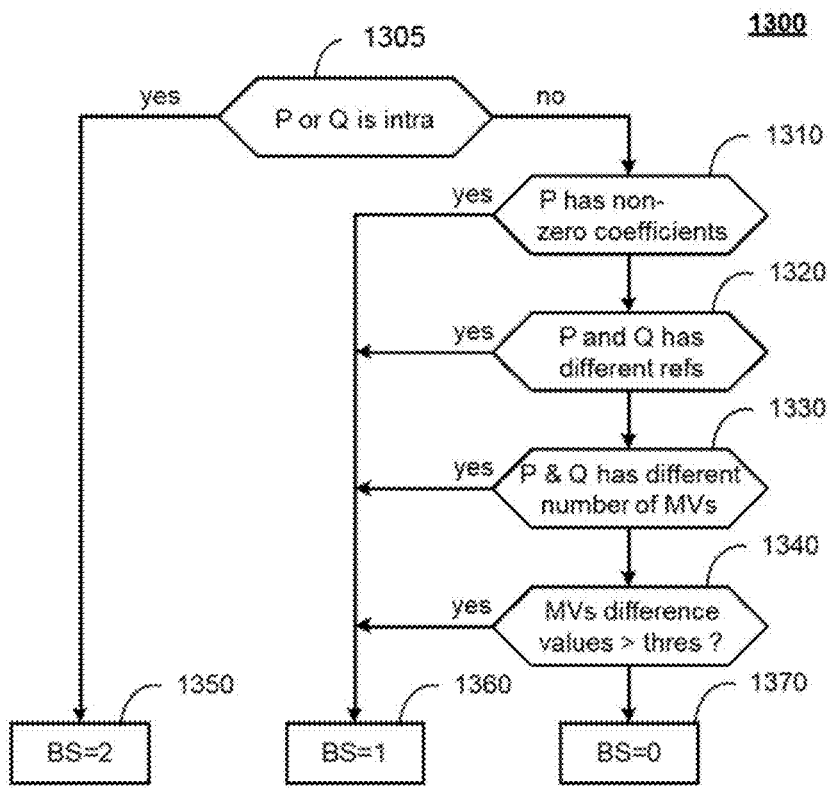
FIG. 13 illustrates a process for determining boundary strength for prediction smoothing.
Figure 14:
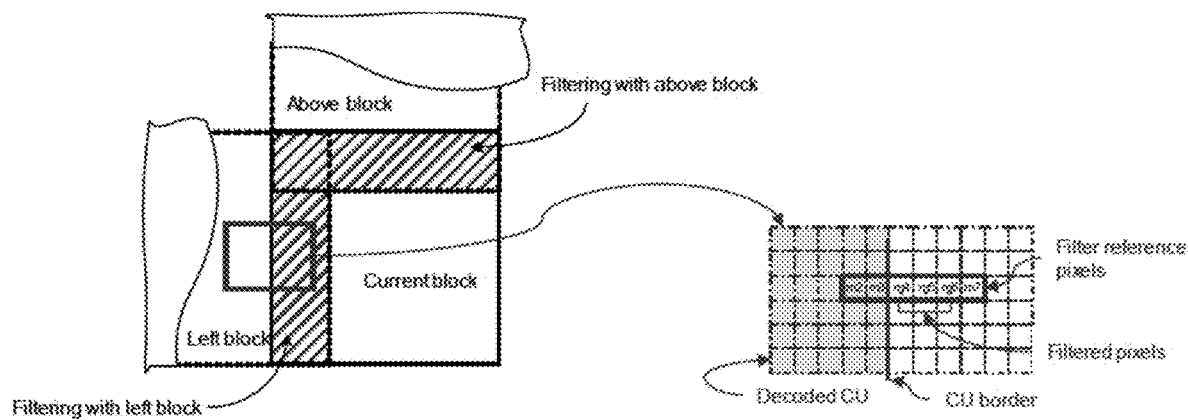
FIG. 14 is a pictorial example illustrating filtering pixels near a boundary, and in particular, strong filtering on horizontal boundary.

As illustrated in FIG. 13, the strong filter modifies 3 pixels near the boundary based on 2 pixels on reconstructed side and 4 pixels on current CU size. The weak filter modifies 2 pixels near boundary, based on 1 pixel on reconstructed side and 3 pixels on current CU size.

All the pixels of current CU along the boundary are filtered as follows (mi' denotes filtered value that replaces mi after the filtering process):

Strong Filter:

$$m4' = \frac{m2 + 2*m3 + 2*m4 + 2*m5 + m6}{8}$$

$$m5' = \frac{m3 + m4 + m5 + m6}{4}$$

$$m6' = \frac{m3 + m4 + m5 + 3*m6 + m7}{8}$$

Weak Filter:

$$m4' = \frac{-3*m2 + 9*m3 + 7*m4 + 3*m5 + 8}{16}$$

$$m5' = \frac{-3*m2 + 9*m3 - m4 + 19*m5 + 8*m6 + 16}{32}$$

For both cases, the filtered value can be clipped with values at the limit of bit-depth range:

$mi''$=clip3(0,(1<<bit depth)−1,$mi'$)

Figure 15:
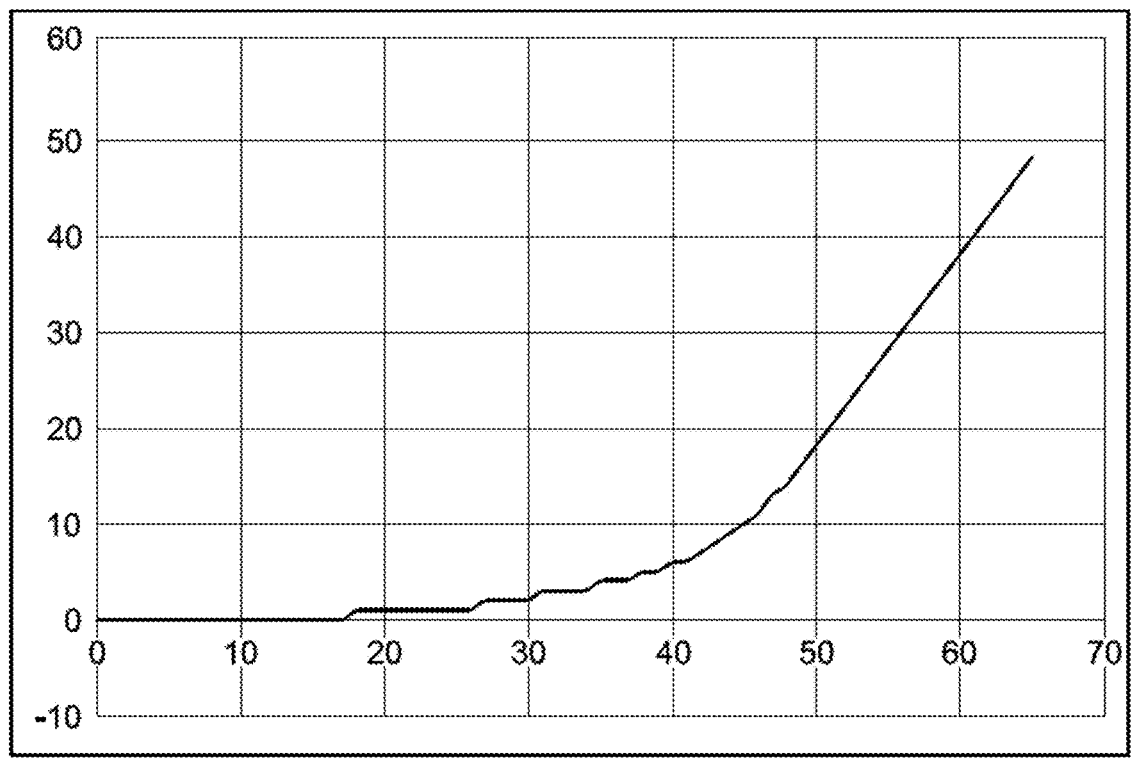
FIG. 15 is a pictorial example illustrating predefined values for TC threshold depending on QP quantization Parameter values.

In a variant, the clipping values are kept close to the original mi value and depend on the Quantization parameter:

$mi''$=clip3($mi-tc,mi+tc,mi'$)

where $tc$=predefinedTable[QP+offset]*(1<<(bitDepthLuma−8))

where QP is the quantization parameter of the reference decoded neighboring CU, offset is an offset typically set to 0, and predefinedTable is defined as an exponential function of the quantization parameter, with a linear part for high QP values in order to keep the TC value rather low for high QP, as illustrated in FIG. 15, for example:

predefinedTable={0, 0, 0, 0, 0, 0, 0, 0, 0, 0, 0, 0, 0, 0, 0, 0, 0, 0, 1, 1, 1, 1, 1, 1, 1, 1, 1, 2, 2, 2, 2, 3, 3, 3, 3, 4, 4, 4, 5, 5, 6, 6, 7, 8, 9, 10, 11, 13, 14, 16, 18, 20, 22, 24, 26, 28, 30, 32, 34, 36, 38, 40, 42, 44, 46, 48}

In order to limit memory bandwidth requirements, accesses to neighboring CU pixels can be limited to one column (resp. row) for vertical (resp. horizontal) boundary filtering.

Filter Strength

The set of conditions for determining the filter strength is modified to remove access to neighboring CU pixels above the first column/row. For example, as follows:

$$|-p1_0+p0_0|+|-p1_3+p0_3|+|q2_0-2q1_0+q0_0|+|q2_3-2q1_3+q0_3|>\beta$$

Filtering Pixels

Strong Filter:

$$m4' = \frac{3*m3 + 2*m4 + 2*m5 + m6}{8}$$

$$m5' = \frac{m3 + m4 + m5 + m6}{4}$$

$$m6' = \frac{m3 + m4 + m5 + 3*m6 + m7}{8}$$

Weak Filter:

$$m4' = \frac{6*m3 + 7*m4 + 3*m5 + 8}{16}$$

$$m5' = \frac{6*m3 - m4 + 19*m5 + 8*m6 + 16}{32}$$

CTU Boundary

In a variant, this limitation is enforced only for CTU borders. Inner-CTU borders (CU borders that are not on a frontier of CTU) are processed as defined previously.

In another variant the filtering is completely disabled for CTU borders.

Top-CTU Row Boundary

In a variant, the filtering is disabled for top CTU row boundary. Horizontal boundaries that are on a CTU frontier are not filtered. All other boundaries are filtered as previously.

Sub-PU Embodiments

Figure 16:
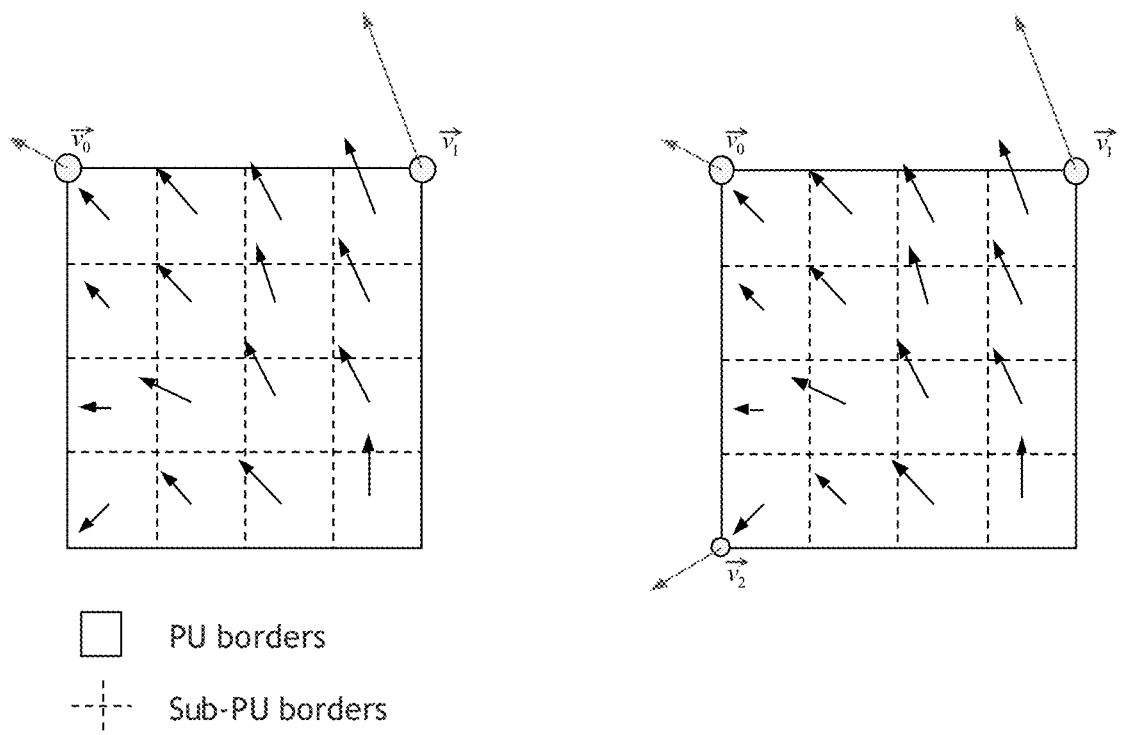
FIG. 16 is a pictorial example illustrating PU prediction with affine mode.

For ATMVP and Affine modes, for example, the PU can be subdivided into smaller PUs for the prediction process. FIG. 16 illustrates PU prediction with affine mode. A prediction model is deduced from 2 or 3 transmitted vectors, and the PU is divided into smaller sub-PUs. In the case when PU can be subdivided into smaller PUs for the prediction process, the filtering is modified as follows:

The PU borders are filtered as described previously, including determination of the boundary strength, determination of the filter strength, and actual filtering.

For the sub-PU boundaries, the weak filter is always used.
The benefit is the following:
usually, the motion variation between neighboring sub-PUs is very small, and thus only weak filtering is needed,
determination of the filter properties is not necessary, which reduces complexity,
the filter is simpler and thus less complex.

Simple Filtering Embodiments

The filtering inspired from the deblocking filter involves a lot of checks and dependencies. For complexity's sake, one may want to simplify the filter design. An example of block boundary smoothing filter can be an adaptation of the one used for PDPC in Intra. This filter needs to be applied only for inter-predicted blocks or PUs (Intra already has its PDPC filtering).

With this embodiment, the result of inter prediction is further modified with a filtering method. This filter involves boundary reference samples (neighboring decoded CU samples). The predicted sample pred(x,y) is modified using a linear combination of reference samples according to the Equation below:

$$\text{pred}(x,y)=(wL \times R_{-1,y}+wT \times R_{x,-1}-wTL \times R_{-1,-1}+(64-wL-wT+wTL) \times \text{pred}(x,y)+32)>>6$$

where $R_{x,-1}$, $R_{-1,y}$ represent the reference samples (in decoded neighboring CUs) located at the top and left of current sample (x, y), respectively, and $R_{-1,-1}$ represents the reference sample located at the top-left corner of the current block.

Figure 17:
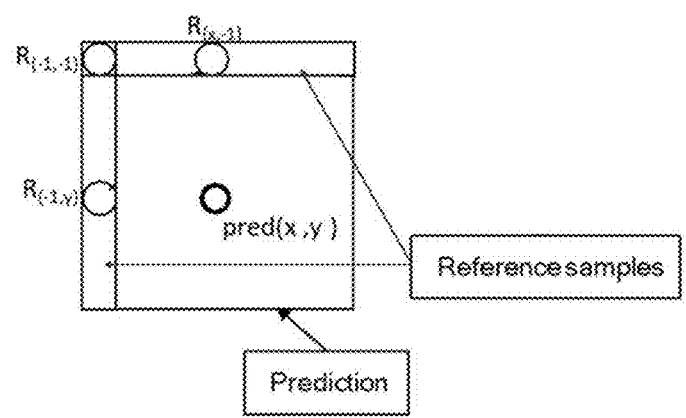
FIG. 17 is a pictorial example illustrating prediction block filtering with boundary samples.

FIG. 17 illustrates definitions of reference samples ($R_{x,-1}$, $R_{-1,y}$ and $R_{-1,-1}$). The weights are shown in Table 1.

TABLE 1

Example of boundary filtering weights

|  | wT | wL | wTL |
| --- | --- | --- | --- |
| sub-PU borders for affine modes | 8 >> ((y << 1) >> shift) | 8 >> ((x << 1) >> shift) | 0 |
| other modes | 16 >> ((y << 1) >> shift) | 16 >> ((x << 1) >> shift) | 0 |

*Shift depends on the block size and controls the width of the impacted pixels band close to the boundary. For example: shift = ((Log2[width] − 2 + Log2[height] − 2 + 2) >> 2).

Per-Boundary Filtering Weights

As for the DBF example, the filtering weights can be selected on a sub-PU basis, and boundary per boundary. For example, depending on left and top neighboring PUs, the left vertical boundary might not be filtered with the same weight as the top horizontal boundary.

Table 2 shows calculation examples of boundary filtering weights dependent on boundary strength values. For example, the boundary strength BS can be determined as depicted on FIG. 11 and as explained before.

TABLE 2

Example of boundary filtering weights dependent on boundary strength

|  | Horizontal boundary pred(x, y) = (wT × $R_{x, -1}$ + (64 − wT) × pred(x, y) + 32) >> 6 | Vertical boundary pred(x, y) = (wL × $R_{-1, y}$ + (64 − wL) × pred(x, y) + 32) >> 6 |
| --- | --- | --- |
| BS = 0 | wT = 0 | wL = 0 |
| BS = 1 | wT = 8 >> ((2*y) >> shift) | wL = 8 >> ((2*x) >> shift) |
| BS = 2 | wT = 16 >> ((2*y) >> shift) | wL = 16 >> ((2*x) >> shift) |

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application may be implemented in many different forms. The various figures and their associated description herewith provide some embodiments, but other embodiments are contemplated. The associated description of the figures does not limit the breadth of the exemplary implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods and other aspects described in this application can be used to modify modules, for example, motion compensation modules (170, 275), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations. Unless indicated otherwise, or technically precluded, the aspects described in this application can be used individually or in combination.

Various numeric values are used in the present application, for example, different block sizes or indices. The specific values are for example purposes and the aspects described are not limited to these specific values.

Figure 18:
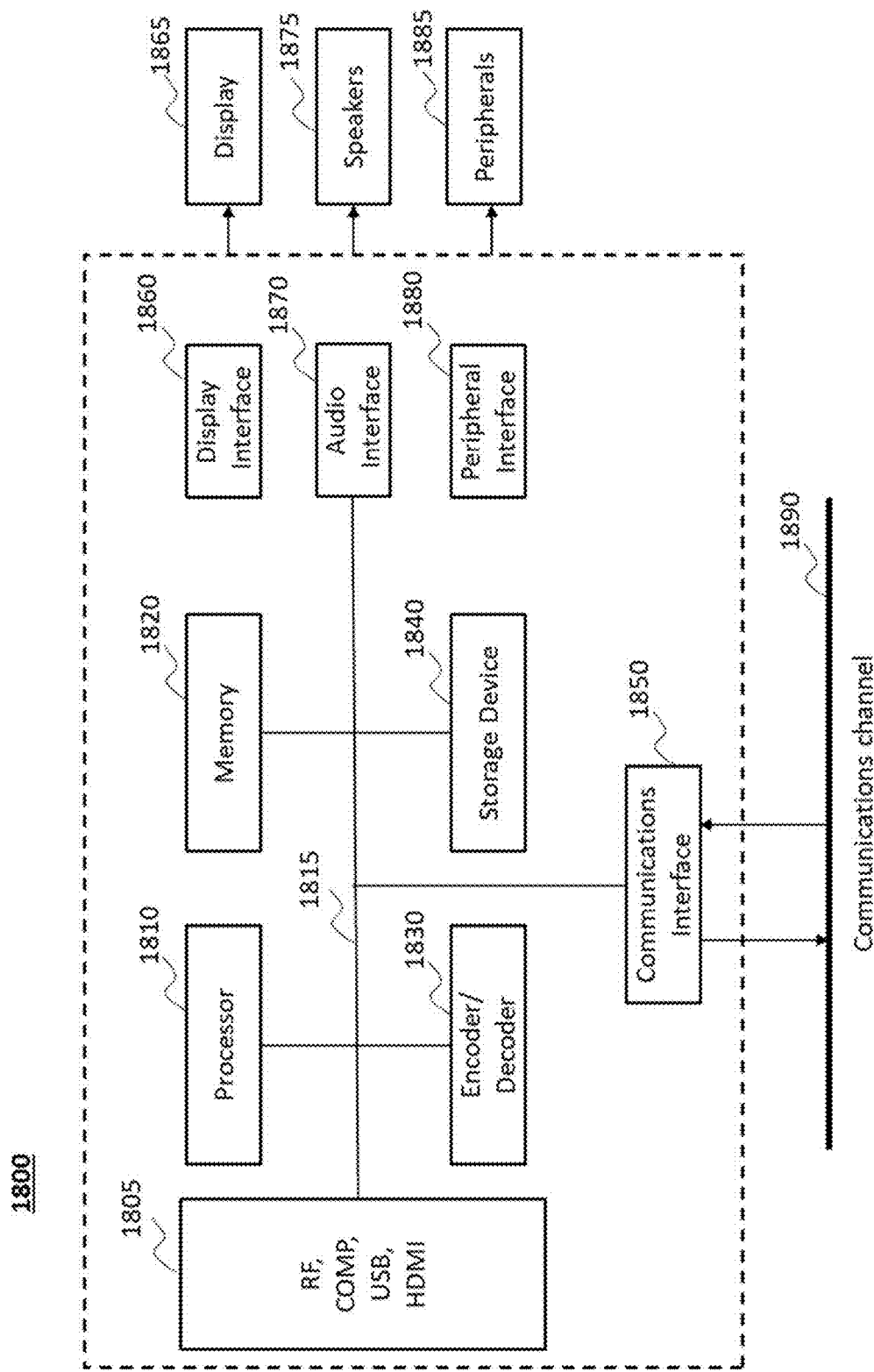
FIG. 18 illustrates a block diagram of a system within which aspects of the present embodiments may be implemented.

FIG. 18 illustrates a block diagram of an example of a system in which various aspects and embodiments are implemented. System 1800 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1800, singly or in combination, may be embodied in a single integrated circuit, multiple ICs, and/or discrete components. For example, in at least one embodiment, the processing and encoder/decoder elements of system 1800 are distributed across multiple ICs and/or discrete components. In various embodiments, the system 1800 is communicatively coupled to other systems, or to other electronic devices, via, for example, a communications bus or through dedicated input and/or output ports. In various embodiments, the system 1800 is configured to implement one or more of the aspects described in this application.

The system 1800 includes at least one processor 1810 configured to execute instructions loaded therein for implementing, for example, the various aspects described in this application. Processor 1810 may include embedded memory, input output interface, and various other circuitries as known in the art. The system 1800 includes at least one memory 1820 (e.g., a volatile memory device, and/or a non-volatile memory device). System 1800 includes a storage device 1840, which may include non-volatile memory and/or volatile memory, including, but not limited to, EEPROM, ROM, PROM, RAM, DRAM, SRAM, flash, magnetic disk drive, and/or optical disk drive. The storage device 1840 may include an internal storage device, an attached storage device, and/or a network accessible storage device, as non-limiting examples.

System 1800 includes an encoder/decoder module 1830 configured, for example, to process data to provide an encoded video or decoded video, and the encoder/decoder module 1830 may include its own processor and memory. The encoder/decoder module 1830 represents module(s) that may be included in a device to perform the encoding and/or decoding functions. As is known, a device may include one or both of the encoding and decoding modules. Additionally, encoder/decoder module 1830 may be implemented as a separate element of system 1800 or may be incorporated within processor 1810 as a combination of hardware and software as known to those skilled in the art.

Program code to be loaded onto processor 1810 or encoder/decoder 1830 to perform the various aspects described in this application may be stored in storage device 1840 and subsequently loaded onto memory 1820 for execution by processor 1810. In accordance with various embodiments, one or more of processor 1810, memory 1820, storage device 1840, and encoder/decoder module 1830 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 1810 and/or the encoder/decoder module 1830 is used to store instructions and to provide working memory for processing that is needed during encoding or decoding. In other embodiments, however, a memory external to the processing device (for example, the processing device may be either the processor 1810 or the encoder/decoder module 1830) is used for one or more of these functions. The external memory may be the memory 1820 and/or the storage device 1840, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1800 may be provided through various input devices as indicated in block 1805. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1805 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 1800 to other electronic devices across USB and/or HDMI connections. It is to be understood that various aspects of input processing, for example, Reed-Solomon error correction, may be implemented, for example, within a separate input processing IC or within processor 1810 as necessary. Similarly, aspects of USB or HDMI interface processing may be implemented within separate interface ICs or within processor 1810 as necessary. The demodulated, error corrected, and demultiplexed stream is provided to various processing elements, including, for example, processor 1810, and encoder/decoder 1830 operating in combination with the memory and storage elements to process the datastream as necessary for presentation on an output device.

Various elements of system 1800 may be provided within an integrated housing, Within the integrated housing, the various elements may be interconnected and transmit data therebetween using suitable connection arrangement 1815, for example, an internal bus as known in the art, including the I2C bus, wiring, and printed circuit boards.

The system 1800 includes communication interface 1850 that enables communication with other devices via communication channel 1890. The communication interface 1850 may include, but is not limited to, a transceiver configured to transmit and to receive data over communication channel 1890. The communication interface 1850 may include, but is not limited to, a modem or network card and the communication channel 1890 may be implemented, for example, within a wired and/or a wireless medium.

Data is streamed to the system 1800, in various embodiments, using a Wi-Fi network such as IEEE 802.11. The Wi-Fi signal of these embodiments is received over the communications channel 1890 and the communications interface 1850 which are adapted for Wi-Fi communications. The communications channel 1890 of these embodiments is typically connected to an access point or router that provides access to outside networks including the Internet for allowing streaming applications and other over-the-top communications. Other embodiments provide streamed data to the system 1800 using a set-top box that delivers the data over the HDMI connection of the input block 1805. Still other embodiments provide streamed data to the system 1800 using the RF connection of the input block 1805.

The system 1800 may provide an output signal to various output devices, including a display 1865, speakers 1875, and other peripheral devices 1885. The other peripheral devices 1885 include, in various examples of embodiments, one or more of a stand-alone DVR, a disk player, a stereo system, a lighting system, and other devices that provide a function based on the output of the system 1800. In various embodiments, control signals are communicated between the system 1800 and the display 1865, speakers 1875, or other peripheral devices 1885 using signaling such as AV.Link, CEC, or other communications protocols that enable device-to-device control with or without user intervention. The output devices may be communicatively coupled to system 1800 via dedicated connections through respective interfaces 1860, 1870, and 1880. Alternatively, the output devices may be connected to system 1800 using the communications channel 1890 via the communications interface 1850. The display 1865 and speakers 1875 may be integrated in a single unit with the other components of system 1800 in an electronic device, for example, a television. In various embodiments, the display interface 1860 includes a display driver, for example, a timing controller (T Con) chip.

The display 1865 and speaker 1875 may alternatively be separate from one or more of the other components, for example, if the RF portion of input 1805 is part of a separate set-top box. In various embodiments in which the display 1865 and speakers 1875 are external components, the output signal may be provided via dedicated output connections, including, for example, HDMI ports, USB ports, or COMP outputs.

Present embodiments may include creating and/or transmitting and/or receiving and/or decoding a bitstream or signal that includes one or more of the described syntax elements, or variations thereof. The embodiments may also comprise a TV, set-top box, cell phone, tablet, or other electronic device that performs bi-prediction according to any of the embodiments described.

Present embodiments may also include a TV, set-top box, cell phone, tablet, or other electronic device that performs bi-prediction according to any of the embodiments described, and that displays (e.g. using a monitor, screen, or other type of display) a resulting image. Present embodiments may also include a TV, set-top box, cell phone, tablet, or other electronic device that tunes (e.g. using a tuner) a channel to receive a signal including an encoded image, and performs bi-prediction according to any of the embodiments described. Present embodiments may also include a TV, set-top box, cell phone, tablet, or other electronic device that receives (e.g. using an antenna) a signal over the air that includes an encoded image, and bi-prediction according to any of the embodiments described.

According to an embodiment, a method for video encoding is presented, comprising: obtaining a prediction block for a current block; obtaining a reconstructed neighboring block of the prediction block; performing filtering on a boundary between the prediction block and the reconstructed neighboring block; and encoding the current block based on the filtered boundary.

According to another embodiment, a method for video decoding is presented, comprising: obtaining a prediction block for a current block; obtaining a reconstructed neighboring block of the prediction block; performing filtering on a boundary between the prediction block and the reconstructed neighboring block; and decoding the current block based on the filtered boundary.

According to another embodiment, an apparatus for video encoding is presented, comprising: means for obtaining a prediction block for a current block; means for obtaining a reconstructed neighboring block of the prediction block; means for performing filtering on a boundary between the prediction block and the reconstructed neighboring block; and means for encoding the current block based on the filtered boundary.

According to another embodiment, an apparatus for video decoding is presented, comprising: means for obtaining a prediction block for a current block; means for obtaining a reconstructed neighboring block of the prediction block; means for performing filtering on a boundary between the prediction block and the reconstructed neighboring block; and means for decoding the current block based on the filtered boundary.

According to another embodiment, an apparatus for video encoding is presented, comprising one or more processors, wherein said one or more processors are configured to: obtain a prediction block for a current block; obtain a reconstructed neighboring block of the prediction block; perform filtering on a boundary between the prediction block and the reconstructed neighboring block; and encode the current block based on the filtered boundary.

According to another embodiment, an apparatus for video decoding is presented, comprising one or more processors, wherein said one or more processors are configured to: obtain a prediction block for a current block; obtain a reconstructed neighboring block of the prediction block; perform filtering on a boundary between the prediction block and the reconstructed neighboring block; and decode the current block based on the filtered boundary.

According to another embodiment, a signal comprising encoded video is formed by performing: obtaining a prediction block for a current block; obtaining a reconstructed neighboring block of the prediction block; performing filtering on a boundary between the prediction block and the reconstructed neighboring block; and encoding the current block based on the filtered boundary.

According to another embodiment, the filtering uses samples from the prediction block and samples from the reconstructed neighboring block.

According to an embodiment, the filtering is also performed at one or more sub-block boundaries inside the current block.

According to an embodiment, the filtering only adjusts samples from the prediction block, without modifying the samples from the reconstructed neighboring block.

According to an embodiment, the prediction block is a motion-compensated prediction block.

According to an embodiment, the motion-compensated prediction block is a block from a reference picture indicated by a motion vector of the current block when the current block uses uni-directional prediction.

According to an embodiment, the motion-compensated prediction block is an average of a block from a first reference picture indicated by a first motion vector of the current block and a block from a second reference picture indicated by a second motion vector of the current block, when the current block uses bi-directional prediction.

According to an embodiment, the motion-compensated prediction may be further adjusted by illumination compensation if local illumination compensation is used.

According to an embodiment, the filtering is performed on multiple boundaries of the prediction block.

According to an embodiment, the prediction block is inter-predicted.

According to an embodiment, the filtering uses a linear combination of reference samples from reconstructed neighboring blocks located at top and left of a current sample.

According to an embodiment, filtering weights are applied to the filtering on a sub-block and/or boundary per boundary basis.

Additionally, an embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
   obtaining a prediction block for a current block, wherein the prediction block is a motion-compensated prediction block;
   obtaining a reconstructed neighboring block of the prediction block;
   filtering at least a sample at a motion prediction stage, in the prediction block, near a boundary between the prediction block and the reconstructed neighboring block, based on one or more samples in the prediction block near the boundary and one or more samples in the reconstructed neighboring block near the boundary;
   obtaining a prediction residual block based on a difference between the filtered prediction block and the current block; and
   encoding the prediction residual block of the current block.

2. The method of claim 1, wherein said current block includes multiple sub-blocks, wherein all sub-blocks of said current block use a common parametric motion model and each sub-block has its own motion vector, and wherein the filtering is also performed at one or more sub-block boundaries inside the current block.

3. The method of claim 1, wherein the filtering only adjusts samples from the prediction block, without modifying the samples from the reconstructed neighboring block.

4. The method of claim 1, wherein the filtering uses a linear combination of reference samples from reconstructed neighboring blocks located at top and left of a current sample.

5. The method of claim 1, wherein a filter strength for filtering said block boundary is selected from at least a first strength and a second strength, said second strength being weaker than said first strength, and wherein said second strength is always used for filtering said one or more sub-block boundaries.

6. A method for video decoding, comprising:
   obtaining a prediction residual block and a prediction block for a current block, wherein the prediction block is a motion-compensated prediction block;
   obtaining a reconstructed neighboring block of the prediction block;
   filtering at least a sample at a motion prediction stage, in the prediction block, near a boundary between the prediction block and the reconstructed neighboring block, based on one or more samples in the prediction block near the boundary and one or more samples in the reconstructed neighboring block near the boundary; and
   decoding the current block based on the prediction residual block and the filtered prediction block.

7. The method of claim 6, wherein said current block includes multiple sub-blocks, wherein all sub-blocks of said current block use a common parametric motion model and each sub-block has its own motion vector, and wherein the filtering is also performed at one or more sub-block boundaries inside the current block.

8. The method of claim 6, wherein the filtering only adjusts samples from the prediction block, without modifying the samples from the reconstructed neighboring block.

9. The method of claim 6, wherein the filtering uses a linear combination of reference samples from reconstructed neighboring blocks located at top and left of a current sample.

10. The method of claim 6, wherein a filter strength for filtering said block boundary is selected from at least a first strength and a second strength, said second strength being weaker than said first strength, and wherein said second strength is always used for filtering said one or more sub-block boundaries.

11. An apparatus for video encoding, comprising one or more processors and at least a memory coupled to the one or more processors, wherein said one or more processors are configured to:
   obtain a prediction block for a current block, wherein the prediction block is a motion-compensated prediction block;
   obtain a reconstructed neighboring block of the prediction block;

filter at least a sample at a motion prediction stage, in the prediction block, near a boundary between the prediction block and the reconstructed neighboring block, based on one or more samples in the prediction block near the boundary and one or more samples in the reconstructed neighboring block near the boundary;

obtain a prediction residual block based on a difference between the filtered prediction block and the current block; and encode the prediction residual block of the current block.

12. The apparatus of claim 11, wherein said current block includes multiple sub-blocks, wherein all sub-blocks of said current block use a common parametric motion model and each sub-block has its own motion vector, and wherein the filtering is also performed at one or more sub-block boundaries inside the current block.

13. The apparatus of claim 11, wherein the filtering only adjusts samples from the prediction block, without modifying the samples from the reconstructed neighboring block.

14. The apparatus of claim 11, wherein the filtering uses a linear combination of reference samples from reconstructed neighboring blocks located at top and left of a current sample.

15. The apparatus of claim 11, wherein a filter strength for filtering said block boundary is selected from at least a first strength and a second strength, said second strength being weaker than said first strength, and wherein said second strength is always used for filtering said one or more sub-block boundaries.

16. An apparatus for video decoding, comprising one or more processors and at least a memory coupled to the one or more processors, wherein said one or more processors are configured to:

obtain a prediction residual block and a prediction block for a current block, wherein the prediction block is a motion-compensated prediction block;

obtain a reconstructed neighboring block of the prediction block;

filter at least a sample at a motion prediction stage, in the prediction block, near a boundary between the prediction block and the reconstructed neighboring block, based on one or more samples in the prediction block near the boundary and one or more samples in the reconstructed neighboring block near the boundary; and decode the current block based on the prediction residual block and the filtered prediction block.

17. The apparatus of claim 16, wherein said current block includes multiple sub-blocks, wherein all sub-blocks of said current block use a common parametric motion model and each sub-block has its own motion vector, and wherein the filtering is also performed at one or more sub-block boundaries inside the current block.

18. The apparatus of claim 16, wherein the filtering only adjusts samples from the prediction block, without modifying the samples from the reconstructed neighboring block.

19. The apparatus of claim 16, wherein the filtering uses a linear combination of reference samples from reconstructed neighboring blocks located at top and left of a current sample.

20. The apparatus of claim 16, wherein a filter strength for filtering said block boundary is selected from at least a first strength and a second strength, said second strength being weaker than said first strength, and wherein said second strength is always used for filtering said one or more sub-block boundaries.

* * * * *